United States Patent Office.

EDWARD DUEMPELMAN, OF NEW YORK, N. Y.

Letters Patent No. 109,724, dated November 29, 1870.

IMPROVEMENT IN CONCRETE FOR PAVING AND ROOFING.

The Schedule referred to in these Letters Patent and making part of the same.

*To all whom it may concern:*

Be it known that I, EDWARD DUEMPELMAN, of the city, county, and State of New York, have invented a new and improved Concrete for Paving, Roofing, and other purposes, which consists in treating either vegetable or animal oils with chloride of sulphur in proportions of one part of chloride to nine parts of oil. Chlorohydric-acid is set free, and an elastic material of the nature of caoutchouc is the result.

Pure asphaltum is then melted, and the material prepared as above is added to it in such proportions as the quality of the asphaltum used may require to give it the proper elasticity and consistency.

While the mass is yet in a fluid state I stir in a quantity of such substances of an absorbent nature as will be sufficient to absorb the fluid particles of the mass and produce a thorough absorption and admixture.

A great variety of substances can be used to mix with the prepared asphaltum, and the use of one material or the other will be determined by the use which is to be made of the artificial mass.

What I claim as my invention, and desire to secure by Letters Patent, is—

The process of sulphurizing of oil, by treatment with chloride of sulphur, in the proportions named, which is to be subsequently added to pure asphaltum, in the manner and for the purposes above described and set forth.

EDWARD DUEMPELMAN.

Witnesses:
SEWALL SERGEANT,
WILLIAM MELDRUM.